United States Patent [19]

Laing

[11] 4,404,960
[45] Sep. 20, 1983

[54] ROOF SKIN FORMING A HEAT SINK

[76] Inventor: Karsten Laing, Herrenstrasse 57, 7500 Karlsruhe, Fed. Rep. of Germany

[21] Appl. No.: 140,995

[22] Filed: Apr. 17, 1980

[30] Foreign Application Priority Data

Apr. 17, 1979 [AT] Austria .................................. 2864/79

[51] Int. Cl.³ ................................................. F24J 3/02
[52] U.S. Cl. .................................. 126/432; 126/447; 126/DIG. 2
[58] Field of Search ......... 126/432, 450, 900, DIG. 2, 126/448, 445, 447; 252/71, 533, 518; 52/543, 553

[56] References Cited

U.S. PATENT DOCUMENTS

| | | | |
|---|---|---|---|
| 4,083,360 | 4/1978 | Courvoisier et al. | 126/450 |
| 4,123,003 | 10/1978 | Winston | 126/DIG. 2 |
| 4,170,984 | 10/1979 | Scheffee | 126/900 |
| 4,202,319 | 5/1980 | Vinz | 126/DIG. 2 |
| 4,244,353 | 1/1981 | Straza | 126/DIG. 2 |
| 4,258,703 | 3/1981 | Reitmaier | 126/445 |
| 4,271,818 | 6/1981 | Hastwell | 126/444 |
| 4,273,106 | 6/1981 | Gould | 126/DIG. 2 |

FOREIGN PATENT DOCUMENTS

| | | | |
|---|---|---|---|
| 2309307 | 8/1974 | Fed. Rep. of Germany | 126/DIG. 2 |
| 2529095 | 1/1977 | Fed. Rep. of Germany | 126/DIG. 2 |
| 1521637 | 8/1978 | United Kingdom | 126/DIG. 2 |

*Primary Examiner*—James C. Yeung
*Attorney, Agent, or Firm*—Pennie & Edmonds

[57] ABSTRACT

An absorber element for the absorption of solar energy, which serves also as a heat exchanger for ambient air and forms the skin of a roof, wherein the outside facing surface of the element is substantially identical in appearance with that of a conventional roof covered with tiles or slates, and wherein the absorber element is along two margins provided with overlap regions for smooth joining of the element with conventional tiles or slates.

11 Claims, 22 Drawing Figures

ROOF SKIN FORMING A HEAT SINK

BACKGROUND OF THE INVENTION

1. Field of the Invention

The invention relates to roofs, whose skin is in heat exchange with a fluid heat carrier and is capable of absorbing solar heat, and also of releasing excess heat.

2. Description of the Prior Art

Solar collectors have an unfavorable appearance, also from the architectural point of view—due to their technical design and are endangered by hail and shocks. Furthermore they do not comply with the fire protection standards of most countries. Since solar collectors are mainly restricted to rectangular elements, additional tiles are required for remaining uncovered areas. If a heat pump is to be installed between the heat absorbing solar collector and the heat-releasing heating element, it is impossible to utilize covered solar collectors, since they are not capable of absorbing heat from the ambient air. If in summer excess heat of an air conditioner is to be radiated by the roof, this is not possible with solar collectors, since the transparent covers prevent heat release.

SUMMARY OF THE INVENTION

The present invention eliminates these disadvantages. It relates to well-known solar energy absorbers, which, however, according to the invention, are identical in appearance with normal roofing elements and which permit a mixed installation with conventional tiles. For this purpose the invention provides for supporting sheet metal elements designed as a roof skin, which look like conventional roofing elements, as, for example, tiles and which have overlapping areas which enable a joint with adjacing roof elements in four directions. A circuit for the liquid heat carrier is connected with the roof skin. The heat carrier channels are preferably formed by extrusion panels having a plurality of parallel channels. As heat carrier serves either the saturated vapor of the heat carrier circuit or an aqueous solution or water or even air. The absorbed heat is guided either directly to the room to be heated or to the evaporator of a heat pump. If air is used as a heat carrier, the invention may provide that the closed circuit may be switched over to an open circuit, so that, during the absence of solar radiation, heat can be extracted from the ambient air.

The invention will now be described, by way of example, with reference to the accompanying diagrammatic drawings, in which:

DESCRIPTION OF THE PREFERRED EMBODIMENTS

Figure 1:
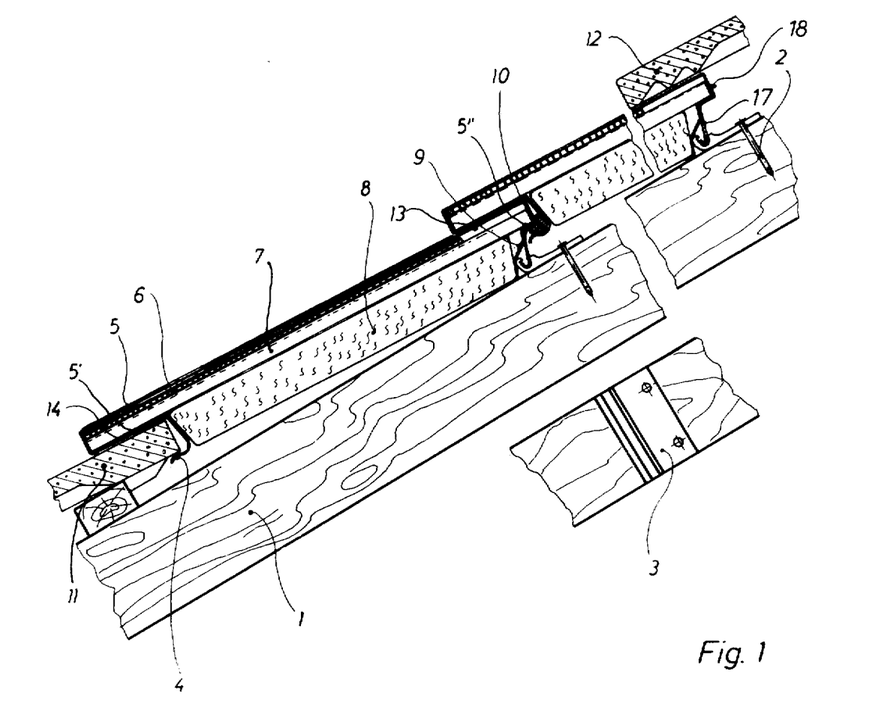
FIG. 1 shows a vertical section through a roof with absorber elements according to the invention.

The absorber elements shown in FIG. 1 are designed as elongate prismatic elements which in their stepped-up formation overlap like tiles. Each absorber element is fixed to roof trusses 1, for example, by nails 2 and hooks 3. The absorber elements consist of sheet metal profiles 4, preferably made of aluminum, which are hooked into the hooks 3. Below the outwardly facing metallic roof skin 5 an extrusion panel 6 is positioned, which consists of a plastics material resistent to hydrolysis. Said panel 6 is pressed over its total surface by a plurality of spring elements 7 to the roof skin 5.

The space between the roof skin and the extrusion panel is filled with a thixotropic liquid having an extremely high boiling point, in order to prevent air gaps from forming in case of small inaccuracies of the contacting surfaces. This liquid should preferably be slightly hygroscopic in order to make up for water losses, which may occur by evaporation at high temperatures, by humidity from the ambient atmosphere. As an alternative the invention provides for a small quantity of liquid, e.g. 0.3 l/m$^2$, to be enclosed between two extremely thin foils welded together along their whole circumference. Below the springs 7 a molded body 8 is positioned, which consists of insulating foam and extends over the whole length, and which is prevented from falling down by a five times folded sheet metal profile 9. The horizontally staggered absorber elements are limited by tiles 11 in downward direction, and by tiles 12 in upward direction.

Figure 2A:
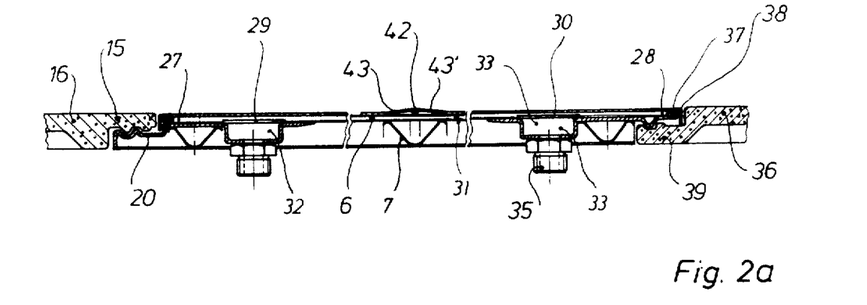
FIG. 2a shows the same absorber element in a longitudinal section.

The extrusion panels (FIG. 2a) are closed at their ends 27 and 28. Near the ends lateral perforations 29 and 30 are provided by perforating the inwardly facing surface 31. Collecting channels 32 and 33 are glued or soldered to the lower side of the panels. The collecting channel 33 is provided with a threaded nipple 35 for the connection to a hose and is furthermore designed as an overlapping area 37. This area corresponds to the right-hand overlapping area 15 of the roof tile 16, so that a right-hand connection with the right-hand adjacing roof tile 36 may be ensured. The roof skin sheet metal is bent, as shown at 38, in order to permit rain water to run off. At the left-hand end of each absorber element a downward facing overlapping area 20 is provided corresponding to the left-hand overlapping area 39 of the tile 36. Herewith also a left-hand joint to the tile 16 is possible, hence a joint to all sides. The spring elements 7 are shown in cross-section.

Figures 2B, 2C:
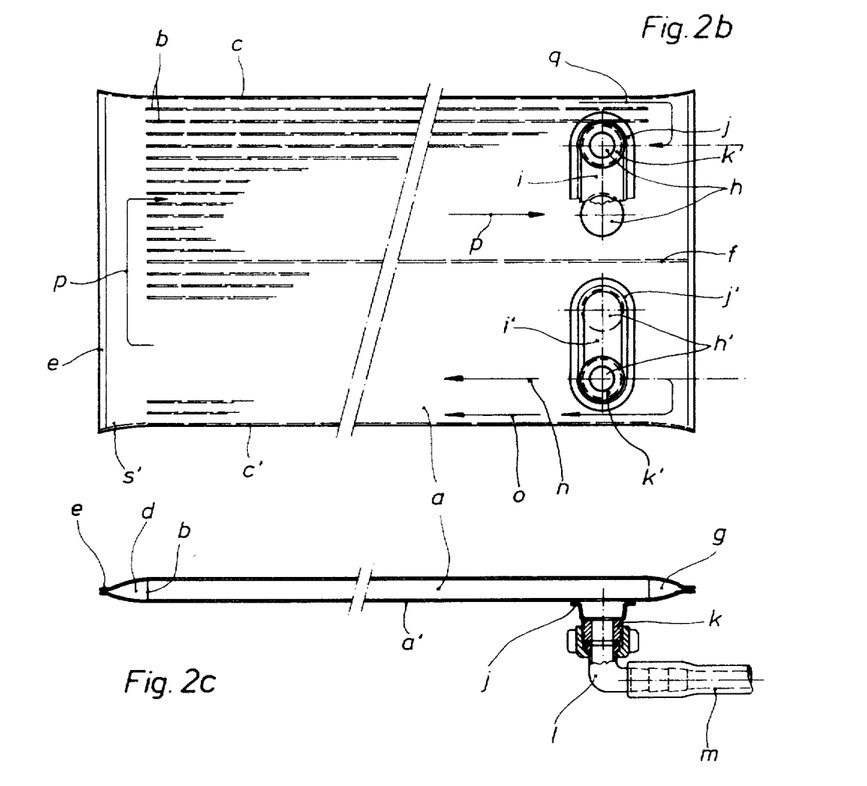
FIGS. 2b and 2c show a further embodiment of an extrusion panel according to the invention.

FIGS. 2b and 2c show a further embodiment of an extrusion panel according to the invention. It is formed by a profile having an upper wall a", a lower wall a', two end webs c, c' and a plurality of inner webs b. The inner webs are shorter than the end webs c, c', so that channels d and g are formed. The panel is closed at both ends by a weld seam e. The middle inner web f is at one end extended or an element is inserted to separate the channel g into two areas. In the lower wall a' of the panel apertures h and h' are provided. Molded bodies i and i' are positioned above these apertures whose flanges j and j' are undetachably fixed to the wall a'. Threaded sockets k' are provided in said molded pieces, to which inlet hoses are connected by threaded connections. The channels are throughflown as shown by arrows n and o. The heat carrier enters the second half of the channels d as shown by the arrow p and leaves it either directly, as shown by the arrow p, or indirectly, as shown by the arrow q.

Figure 2D:
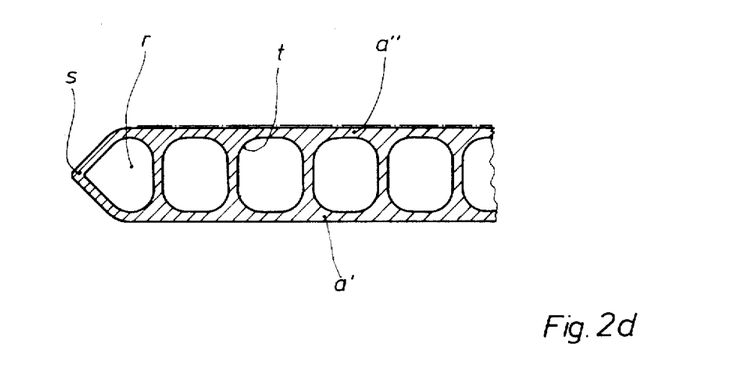
FIG. 2d shows the configuration of the panels and the cross-section of the channels.

In FIG. 2d the channels r next to the edges have a fold edge s, which permits perfect formation of the squeezed areas s' as shown in FIGS. 2b and 2c. The webs end, via a radius of curvature t, in the wall areas a' and a", whereby notch tension can be safely eliminated.

Figures 3, 4A, 4B, 6A, 6B:
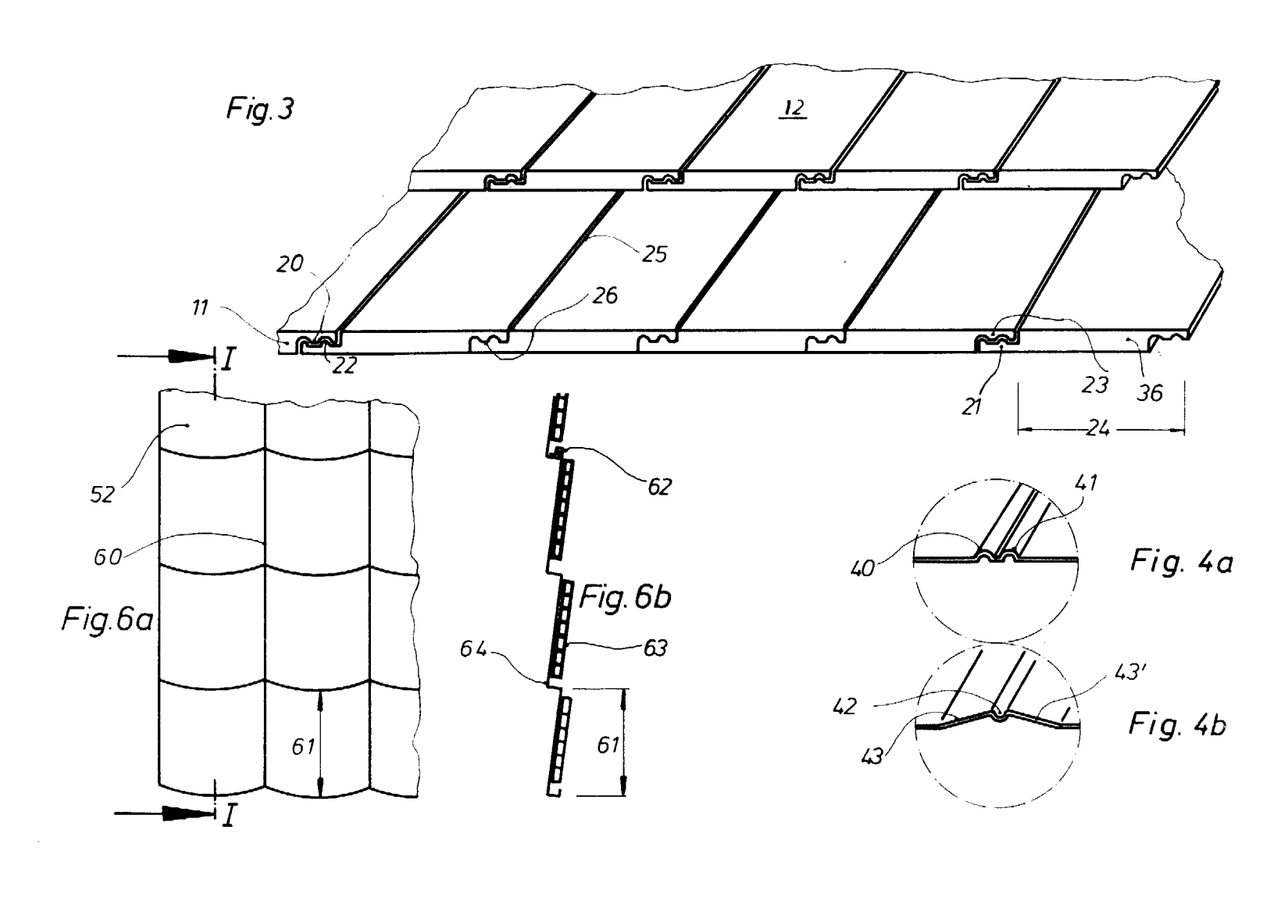
FIG. 3 shows the upper and the lateral ends of the absorber elements.
FIGS. 4a and 4b show the configuration of the markings for the absorber elements.
FIG. 6a shows the further configuration of the roof according to the invention.
FIG. 6b shows the same roof along the line of intersection I—I.

In FIG. 3 at the left-hand side a roof tile 11 is positioned, while on the right-hand side is a roof tile 36. At the upper end tiles 12 follow. The absorber elements have markings 25 and 26 in a distance corresponding to the tile width, thus simulating—over the total length of the absorber element—a row of tiles.

FIG. 4a shows the configuration of the marking 25 in the form of two elevations 40, 41.

FIG. 4b shows the configuration of the markings 25 in the form of a groove 42, running along the highest point of an elevation with lateral surfaces 43 and 43'. The elevation facilitates correct seating of the extrusion panel 6 without hindrance by the roof skin 5.

Figure 5A:
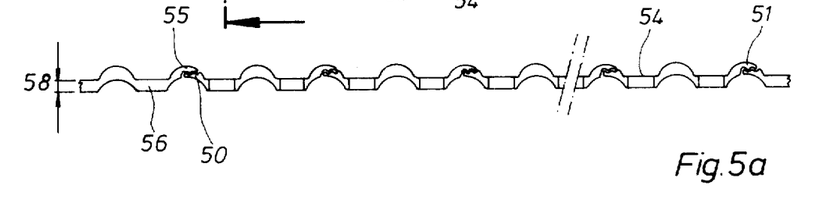
FIG. 5a shows the left-hand side of the absorber elements

FIG. 5a shows the joint of the left-hand side of the tile 56 with the overlapping area 55, furthermore of the absorber element with the left-hand overlapping area 50 and of the right-hand overlapping area 51.

Figure 5B:
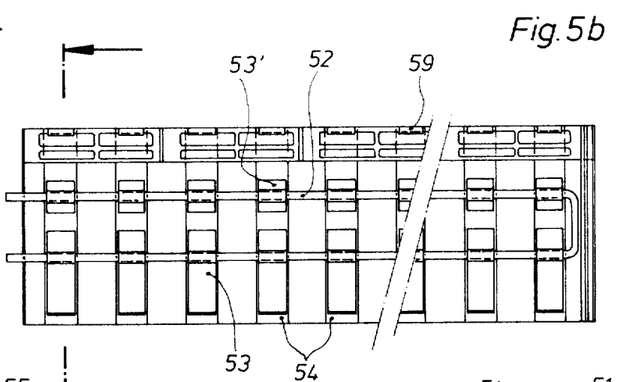
FIG. 5b shows a view of the absorber shingles from below.

As an alternative version of the configuration according to FIG. 1, the embodiment shown in FIG. 5b has an evaporator tube 52, which is undetachably connected to and in good heat contact with plane areas 54 of the absorber element by flaps 53.

Figure 5C:
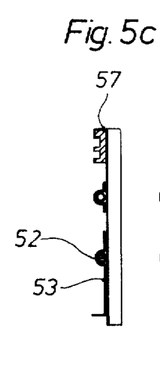
FIG. 5c shows a cross-section through the absorber panel.

Along the edge 57 (FIG. 5c) visible from the bottom, filling pieces having a thickness 58 according to FIG. 5a, preferably made of thermoplastic material, are inserted. These filling pieces are kept in their position by flaps 59 shown in FIG. 5b.

FIG. 6a shows another configuration of the roof, in which the absorber elements simulate tiles with the aid of markings 60, as shown in FIG. 4.

An absorber element (FIG. 6b) covers several tile heights 61. Staggered absorber elements intermesh like hooks (as shown at 62) so that rain water runs off without hindrance. The extrusion panels 63 are made of extruded aluminum and are glued to the sheet metal roof 64.

Figure 7:
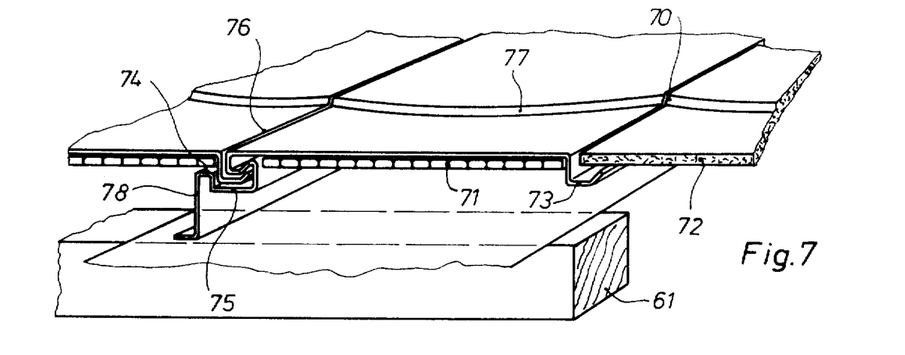
FIG. 7 shows an embodiment according to the invention, in which the absorber shingles extend in direction of the roof slope.

In FIG. 7 tiles are simulated by markings along the area 70. In this embodiment the extrusion panels 71 have a height which is the same as that of the skin tiles. Also in this case a continuous transition from the absorber element to the conventional tiles 72 is possible; in case of a right-hand connection the tile 72 rests on the edge 73, which edge has to be supported by a wooden ledge (not shown), while in case of a left-hand connection the tile rests on the elevation 74 of the sheet metal roof skin. The left-hand limitation has a trough 75, through which rain water, which penetrates the gap 76, can flow off.

Figure 8A:
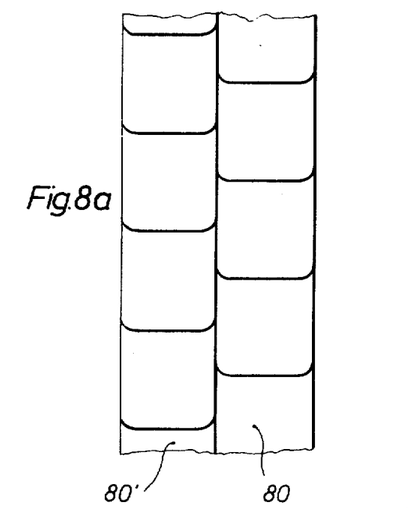
FIG. 8a is a plan view of two adjoining absorber elements constructed according to the invention.

FIG. 8a shows in a reduced scale two adjacing absorber elements 80 and 80'.

Figure 8B:
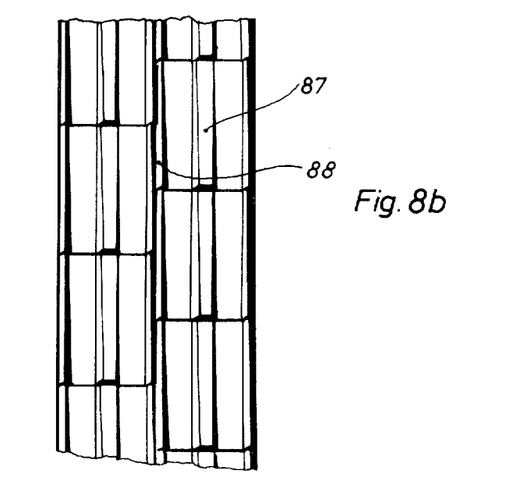
FIG. 8b is a plan view of absorber elements in the form of a roof skin simulating tiles.

FIG. 8b shows an embodiment of the same design principle in the form of a roof skin simulating tiles.

In principle, in all embodiments of the absorber elements air can be used as a heat carrier.

Figure 9:
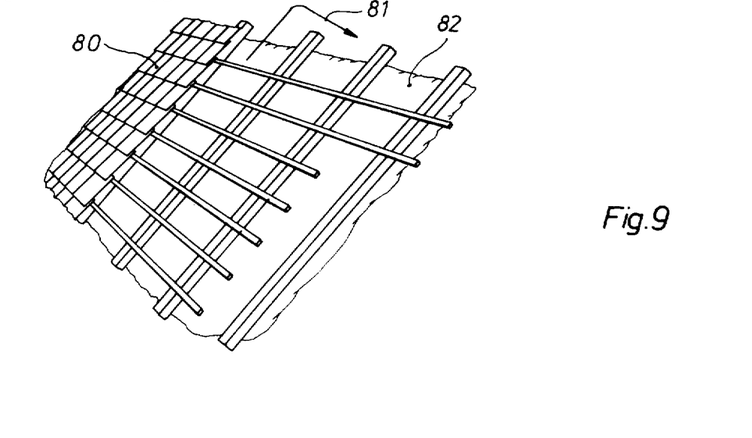
FIG. 9 is a perspective view of absorber elements installed along a roof slope.

FIG. 9 shows a roof which is covered by absorber elements 80 alongside the roof slope. The air flows, as shown by the arrow 81, between the absorber elements 80 and a wall 82 facing to the inside. The air 81 is preferably guided in a circuit.

Figure 10:
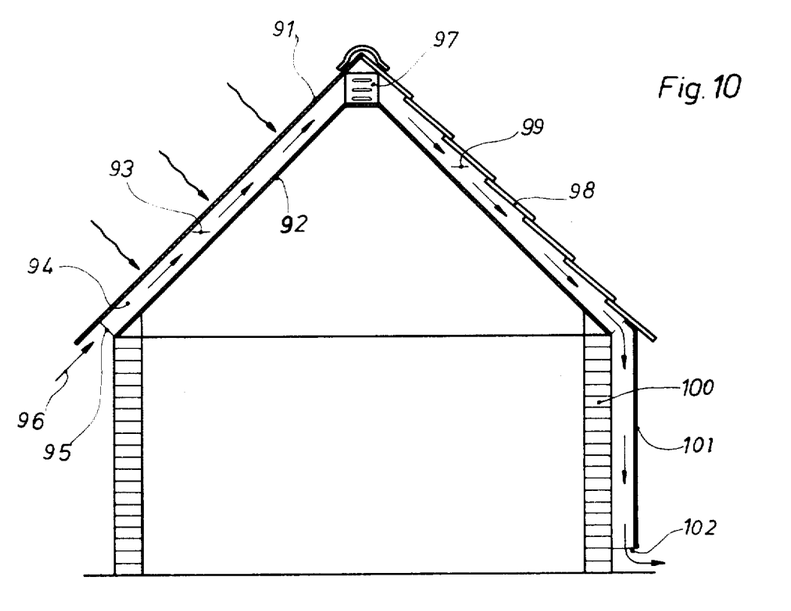
FIG. 10 is a side elevational view of a building having a roof skin constructed according to the invention.

FIG. 10 shows an embodiment according to the invention of a roof skin 91 preferably sloping to the south, which forms, together with a foil 92, a channel 93, which corresponds in its width to the height of the spars 94. Through the aperture 95 facing downwardly, the ambient air 96 flows into the channel 93, gets a lift by being heated up through the roof skin 91 and flows then through a finned heat exchanger 97 positioned near the ridge, which may extend over the total length of the house. Below the side 98 of the roof averted from the main direction of insolation an air channel 99 is positioned, which is continued along the wall of the house 100 by a wall 101 up to an outlet 102. In this embodiment the air 96 heated up below the roof skin 91 and then cooled down in the evaporator 97 gets an impulse, so that during the insolation air continuously circulates in an open circuit and releases heat to the heat exchanger.

Figure 11:
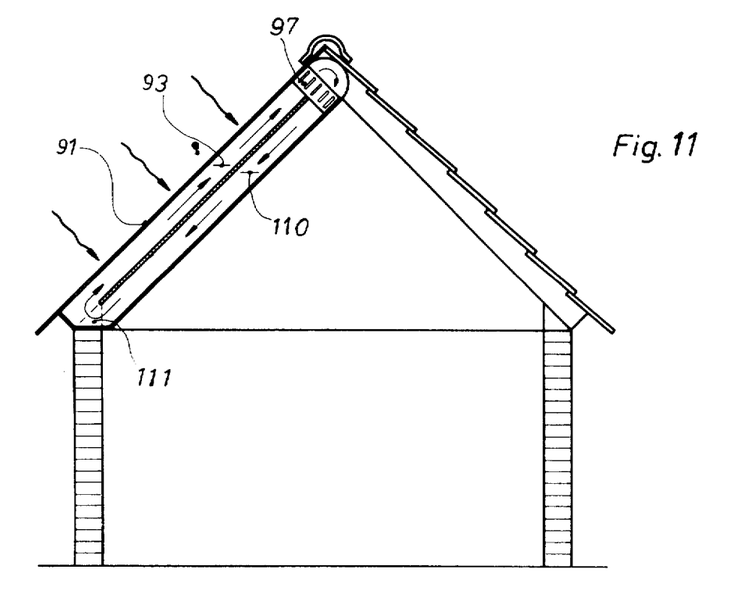
FIG. 11 is a side elevational view of a building having a further roof skin constructed according to the invention.

FIG. 11 shows practically the same configuration, in which the air stream circulates in a closed circuit. In the channel 93 the air moves up, while in the channel 110 the air, cooled down in the evaporator 97, moves down and re-enters, in the lower part 111, the channel 93. Already after the air has once been circulated, it is dehumidified to such an extent that no heat-insulating condensate layers occur at the fins of the evaporator 97.

Figure 12:
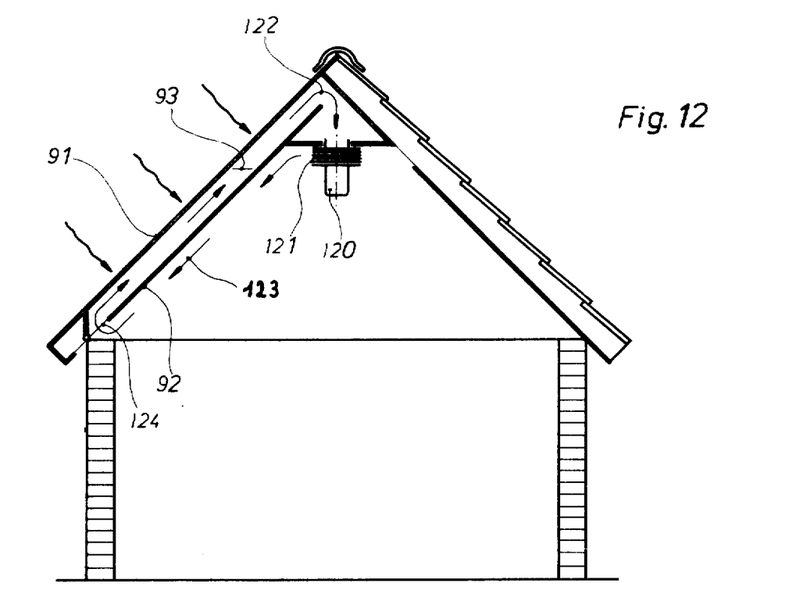
FIG. 12 is a side elevational view of a building having a further embodiment of a roof skin according to the invention.

FIG. 12 shows an embodiment in which a heat pump 120 with an air circulation device 121 sucks air as shown by the arrow 122 and causes it to flow through the channel 93. This air flows, as shown by the arrow 123, to the slot 124 and back again into the channel 93. Already after once passing the cold evaporator the air is dehumidified.

Figure 13:
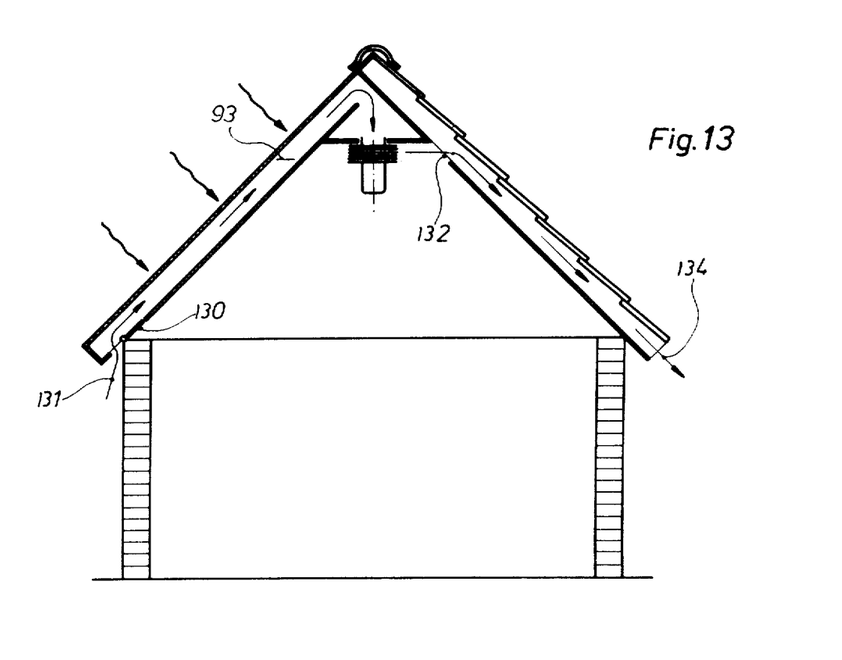
FIG. 13 is a side elevational view of a building having a still further embodiment of a roof skin constructed according to the invention.

FIG. 13 shows an embodiment in which the backflow of the air (as shown by the arrow 123 in FIG. 12) is prevented by a hinged flap 130, so that the ambient air enters the channel 93 as shown by the arrow 131. The cooled down air is blown to the outside, as shown by the arrows 134, through a further aperture 132.

Figure 14:
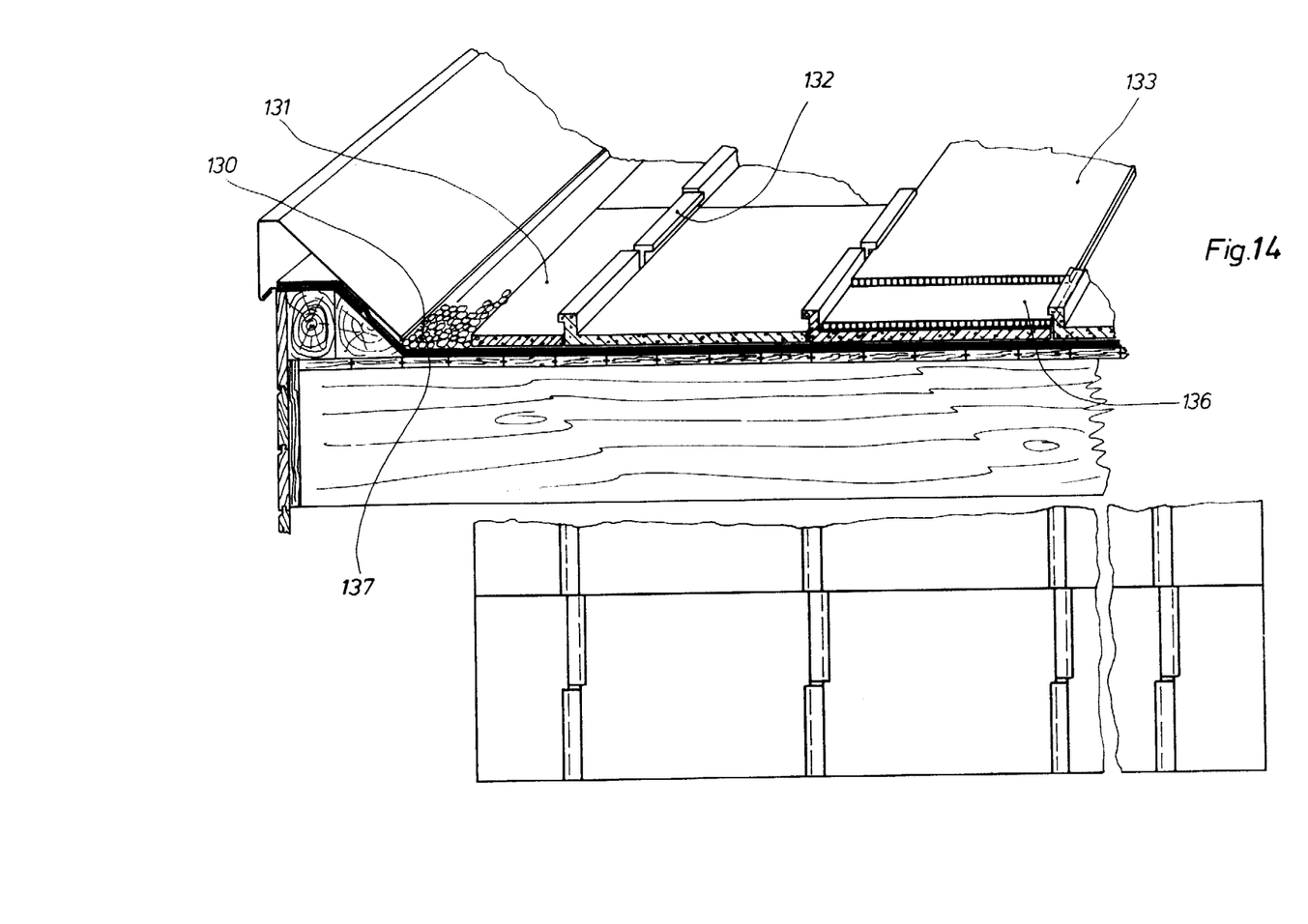
FIG. 14 shows an absorber element for flat roofs.

In the embodiment shown in FIG. 14 the original roof skin 137 may remain. Gravel 130 is replaced by blocks 131 which embrace absorber elements. The weight of the blocks per square meter corresponds approximately to the weight of the replaced gravel. The blocks are so arranged that the absorber elements are embraced at least along half of their length by cramps 132. This ensures that even during strong stroms the loosely inserted absorber elements 133 cannot be blown off. The absorber elements consist of an extrusion panel 133 shown in cross-section, which are throughflown by a heat carrier. A double-wall panel 136 is positioned below the absorber element, which, however, serves only as a heat insulating means.

I claim:

1. An absorber element for the absorption of solar energy and for exchanging heat with ambient air, characterized in that said element has a radiation absorption metal plate with an outer facing surface adapted to act as a roof skin and to be exposed to ambient air where the outer facing surface is substantially identical in appearance with that of a conventional roof covered with a plurality of conventional shingles, in that said element has a plastic extrusion panel with a plurality of fluid channels therein adapted to contain a heat carrier fluid and where the extrusion panel is engaged with said metal plate to provide direct thermal communication with an inner facing surface of the metal plate opposite said outer facing surface, in that the length of one margin of said element corresponds to the width of a plurality of conventional shingles, and in that said element has an overlapping region along two margins thereof adapted to join with conventional shingles.

2. An absorber element according to claim 1 further characterized in that said element has spring means urging said plastic extrusion panel into engagement with said metal plate.

3. An absorber element according to claim 1 further characterized in that the outer facing metal surface has markings thereon similar to separation lines between adjacent conventional shingles.

4. An absorber element according to claim 3 further characterized in that each marking is formed by two raised portions on said outer facing metal surface.

5. An absorber element according to claim 3 further characterized in that each marking is formed by a groove situated between two sloping regions on said outer facing metal surface.

6. An absorber element according to claim 1 further characterized in that said extrusion panel comprises two spaced apart walls welded together at their edges and a plurality of webs extending between the walls to form channels in said panel.

7. An absorber element according to claim 6 further characterized in that an area of contact between said webs and said walls is rounded.

8. A roof with rafters including at least two elements according to claim 1 the elements having arms which extend up to the rafters and have extensions which extend into a groove of an adjacent element.

9. A roof having rafters, a roof skin, including at least one element according to claim 1, being situated above the rafters and a wall below the rafters, channels being defined between the skin and wall through which air is guided.

10. A roof having a roof skin including at least one element according to claim 1 and a second downwardly leading channel, an evaporator-cum-heat exchanger of a heat pump being situated near the highest point of the two channels.

11. A roof having a roof skin including at least one element according to claim 1, a slanting channel being situated below the skin, a heat exchanger being situated at the upper end of the channel, air heated in the channel flowing to the heat exchanger and from the heat exchanger back into the channel through an opening at the lowest end thereof.

* * * * *